United States Patent
Lojeck et al.

(10) Patent No.: US 9,438,411 B1
(45) Date of Patent: Sep. 6, 2016

(54) METHOD AND APPARATUS FOR SYNCHRONIZING DIGITAL MESSAGES

(71) Applicant: THE BOEING COMPANY, Huntington Beach, CA (US)

(72) Inventors: Brian C Lojeck, Compton, CA (US); Albert A Williams, League City, TX (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/824,330

(22) Filed: Aug. 12, 2015

(51) Int. Cl.
*H04L 7/04* (2006.01)

(52) U.S. Cl.
CPC ..................... *H04L 7/042* (2013.01)

(58) Field of Classification Search
CPC ....................................................... H04L 7/042
See application file for complete search history.

(56) References Cited

U.S. PATENT DOCUMENTS

| | | | | |
|---|---|---|---|---|
| 5,212,690 A * | 5/1993 | Low | .......................... | H04L 7/042 370/514 |
| 5,260,967 A * | 11/1993 | Schilling | ................ | H04B 1/707 370/342 |
| 5,265,207 A * | 11/1993 | Zak | .......................... | G06F 11/08 370/408 |
| 5,333,268 A * | 7/1994 | Douglas | .................. | G06F 11/08 370/408 |
| 5,799,088 A * | 8/1998 | Raike | .................... | H04L 9/0662 380/30 |
| 6,118,825 A * | 9/2000 | Ikeda | ...................... | H03D 1/00 375/259 |
| 6,275,966 B1 * | 8/2001 | Sitterley | ............... | H03M 13/00 375/295 |
| 7,372,930 B2 | 5/2008 | Van Der Putten et al. | | |
| 8,281,228 B2 | 10/2012 | Geng et al. | | |
| 9,319,095 B2 * | 4/2016 | Schmidl | ................. | H04B 1/707 |
| 2002/0012445 A1 * | 1/2002 | Perry | ..................... | G06Q 10/00 382/100 |
| 2002/0157005 A1 * | 10/2002 | Brunk | .................. | G06Q 20/401 713/176 |
| 2004/0019783 A1 * | 1/2004 | Hawkes | ................ | H04L 9/0637 713/161 |
| 2008/0232431 A1 * | 9/2008 | Sanji | ....................... | B60R 25/24 375/130 |
| 2009/0323772 A1 * | 12/2009 | Sanji | ................... | H04B 1/7077 375/141 |
| 2010/0178419 A1 | 7/2010 | Baillin | | |
| 2015/0006683 A1 | 1/2015 | Panje et al. | | |

* cited by examiner

*Primary Examiner* — Kenneth Lam
(74) *Attorney, Agent, or Firm* — Nexsen Pruet, PLLC

(57) ABSTRACT

A method and system for synchronizing digital messages. A digital message includes a start-of-message indicator, followed by a key word, followed by the message payload. Before transmitting the digital message, the payload is combined in an exclusive-OR operation with the key word, which is chosen from a pre-designated pool of key words. Each pool represents a message of different type, which is type is related to word length. The key word and start-of-message indicator are appended to the resulting exclusive-OR digital message and transmitted. On receipt, the start-of-message indicator indicates the start of the message, and the key word determines the message word length and, after a second exclusive-OR operation with the key word, restores the original digital message. The start of the message is positively identified without additions to the message payload and without the key word ever appearing in the payload during transmission.

20 Claims, 3 Drawing Sheets

METHOD AND APPARATUS FOR SYNCHRONIZING DIGITAL MESSAGES

TECHNOLOGICAL FIELD

The present disclosure relates generally to digital communication synchronization. More specifically, the present disclosure relates to a method and apparatus for enabling the recipient computer to identify the start, length, and type of a message so as to be able to synchronize the message. This disclosure resulted in the performance of work under NASA Contract No. NNK14MA75C and is subject to the provisions of Section 305 of the National Aeronautics and Space Act of 1958 (72 Stat.435: 42 U.S.C. 2457).

BACKGROUND

Asynchronous digital message systems require an indicator of the start of a message. The usual indicator is a specific digital bit sequence positioned at the start of a message, but this indicator is not always reliable, particularly if the same word used for the indicator may appear somewhere else in the body of the message. If the bit sequence used as the start-of-message-indicator appears in the body of the message, then the receiving processor may assume a new message has been started before the current message has actually ended.

Various alternative solutions involve either escape sequences to mark the start of a sequence in a message or the use of bit-stuffing to replace the forbidden bit sequence with a permissible one. Both of these approaches, however, involve significant processing on receipt of the message, and have the undesirable effect of rendering the total message length un-predictable, which only further complicates the design of the receiving elements. Another typical method to identify the start of a message is to include additional words or codes in the message payload. This, however, also lengthens the message with single-purpose data, spending bits for no use beyond message identification. Moreover, if the receiving circuit is a field programmable gate array (FPGA) or hardware-based design, this complication might significantly alter the chip design, its power consumption, and its operating speed.

Other circumstances in which computers communicate over asynchronous transmission channels all require some scheme to deal with synchronization, typically reserving a symbol for denoting message start that is prohibited from use in the message.

Still other solutions for synchronizing messages use the selection of a pattern of symbols to indicate the start of a message and accept the risk that the indicator may occur in the data (which can lead to incorrect synchronization). If a single byte is used, the chance of error is high unless the data has some characteristic that allows a unique byte to be selected (which is rarely the case in a highly efficient design). If multiple bytes are used, each additional byte reduces the chance of error but at a cost of efficiency. Even when many bytes are used, there is a finite chance of accidentally synchronizing on part of a data packet.

A start-of-message indicator that ensures synchronization of the systems while maintaining rigid message structure and does not add to or vary the message length would be highly desirable. In addition, a start-of-message indicator that also identifies different types of messages would be an added advantage.

SUMMARY

The present disclosure describes a method and apparatus for identifying the start of a digital message and the message type. A logical operation is performed on the message to assure that the start-of-message indicator does not appear in the message. Unlike other message synchronizing systems, the present method and apparatus also controls the message length and allows the type of the message to be indicated.

The method uses a single word, referred to herein as a key, to identify the message type, which type is characterized by a fixed number of words, and to assure that the start-of-message indicator does not appear elsewhere in the message operations. Message length is strictly controlled and never exceeds the planned length for a particular message type.

The "key" or "key word" operates on each of the words in the digital message through an exclusive-OR logical operation to produce an exclusive-OR digital message for transmission. That process assures that the key word does not occur in the message. Furthermore, since the start-of-message indicator is selected to have a value of all zeros and to be different from the key word, use of the exclusive-OR operation on the words of the message also assures that the start-of-message indicator is not present in the message as well. The exclusive-OR operation is highly efficient in both hardware and software, allowing higher speed, smaller, simpler receiver and transmitter designs. The key word also identifies the message type which is related to the number of words in the digital message. By simplifying message type identification and therefore word length, this method enhances system reliability, testability, and safety, but without increasing the message length or overly complicating the receiver or transmitter designs.

An aspect of the present method for sending a digital message is the selection of a digital message having at least one word and a key word, and then performing an exclusive-OR operation using the key word and the words of the digital message to obtain an exclusive-OR digital message. The key word is appended to the exclusive-OR digital message and then transmitted to the receiver. The term appended is used herein to mean that the key word is added to the digital message but does not implicate the location of the key word with respect to the words of the digital message. At the receiver, the key word is removed and used in a second exclusive-OR operation on the exclusive-OR digital message to obtain the original digital message.

Another aspect of the disclosure is the selection of the key word from a preselected pool of key words for each digital message type.

In still another aspect of the present disclosure, the type of digital message is determined and the key word is selected from the pool of key words that corresponds to that type of message.

In another aspect of the disclosure, a start of message indicator, which is an all-zeros word, and the key word are both appended to the exclusive-OR digital message before forwarding to the transmitter for transmission to the receiver. The start-of-message word must be the first word in the transmission followed by the key word and then the exclusive-OR digital message.

In yet another aspect of the disclosure, all digital words including the start-of-message indicator and key word have the same number of bits.

Another aspect of the disclosure is a method for sending digital messages including identifying both the type of digital message to be transmitted and the number of digital words in that type as well as the total number of digital words possible based on the number of bits in a digital word. Then key words are selected into the key pool from the total possible digital words, with the number of key words selected being larger than the number of digital words in the digital message of that type. Next, a start-of-message indicator is selected along with one key word from the key word pool. The selected key word must not be the same as any word in the digital message and the start-of-message indicator. Then an exclusive-OR operation is performed on the digital words of the digital message using the selected key word to form an exclusive-OR digital message. The key word is then appended to the exclusive-OR digital message and the start-of-message indicator word, the selected key word, and the exclusive-OR digital message are transmitted to a receiver. On receipt, an exclusive-OR operation is performed on the exclusive-OR digital message using the key word to recreate the original digital message.

In another aspect of the disclosure, a communication system includes a transmitter and a receiver, a first processor, a second processor and a first memory. The first processor is configured to receive a digital message and perform an exclusive-OR operation on the digital message using a key word selected from a pool of key words in the first memory. The key word is appended to the resulting exclusive-OR digital message and sent to the transmitter. The receiver forwards the message to the second processor for performing an exclusive-OR operation on the received exclusive-OR digital message using the key word to restore the original message.

Another aspect of the disclosure is a second memory in communication with the second processor for storing the pool of key words so that the key word appended to the exclusive-OR digital message can be compared to determine the length of the received message for appropriate processing. In the present method, the user needs a number of key words, namely at least one more key word than the total number of words in the message so that there will always be at least one word that does not have the same value as a word in the message to serve as the key word for that message. When there are different message types being sent, each type containing a different number of words, then key word pools may be formed for the different message types. The total number of key words in all the pools for all the types may be large but can still smaller than the total number of words that may be formed from even a relatively small number of bits. Importantly, for each message, there will always be at least one word in the pool associated with messages of that type of message that is not in that message and can serve as the key word to identify the type of message being sent.

This method avoids the cost of designing systems to solve these recurring issues in low-cost communication system while also increasing robustness and reducing overhead requirements compared to other systems.

The present method requires at least two digital devices communicating across a digital link. The link may be serial or parallel, synchronous or asynchronous. This method, however, is most productive on asynchronous links. This method is of the most benefit to a link that is Time-Domain-Multiplexed. However, it also benefits systems that are multiplexed in the Frequency Domain. The present method may also be of advantage in life-critical messaging, even if separate physical sub-links are used, because it helps to assure proper message identification in the event of cross-wiring. This method requires less processing power and less bandwidth than any other known method, but avoids content limitations and maintains rigid control over message length, features not available in other methods.

The method is readily applicable to any two systems that communicate using asynchronous protocols via wire, fiber, or wireless media. For example, Point-to-Point Protocol (PPP) carries Internet traffic over asynchronous serial channels, although it uses other, less efficient mechanisms to accomplish synchronization. Message synchronization is a ubiquitous issue in digital communications and the present method is therefore widely applicable.

BRIEF DESCRIPTION OF THE DRAWINGS

Figure 1:
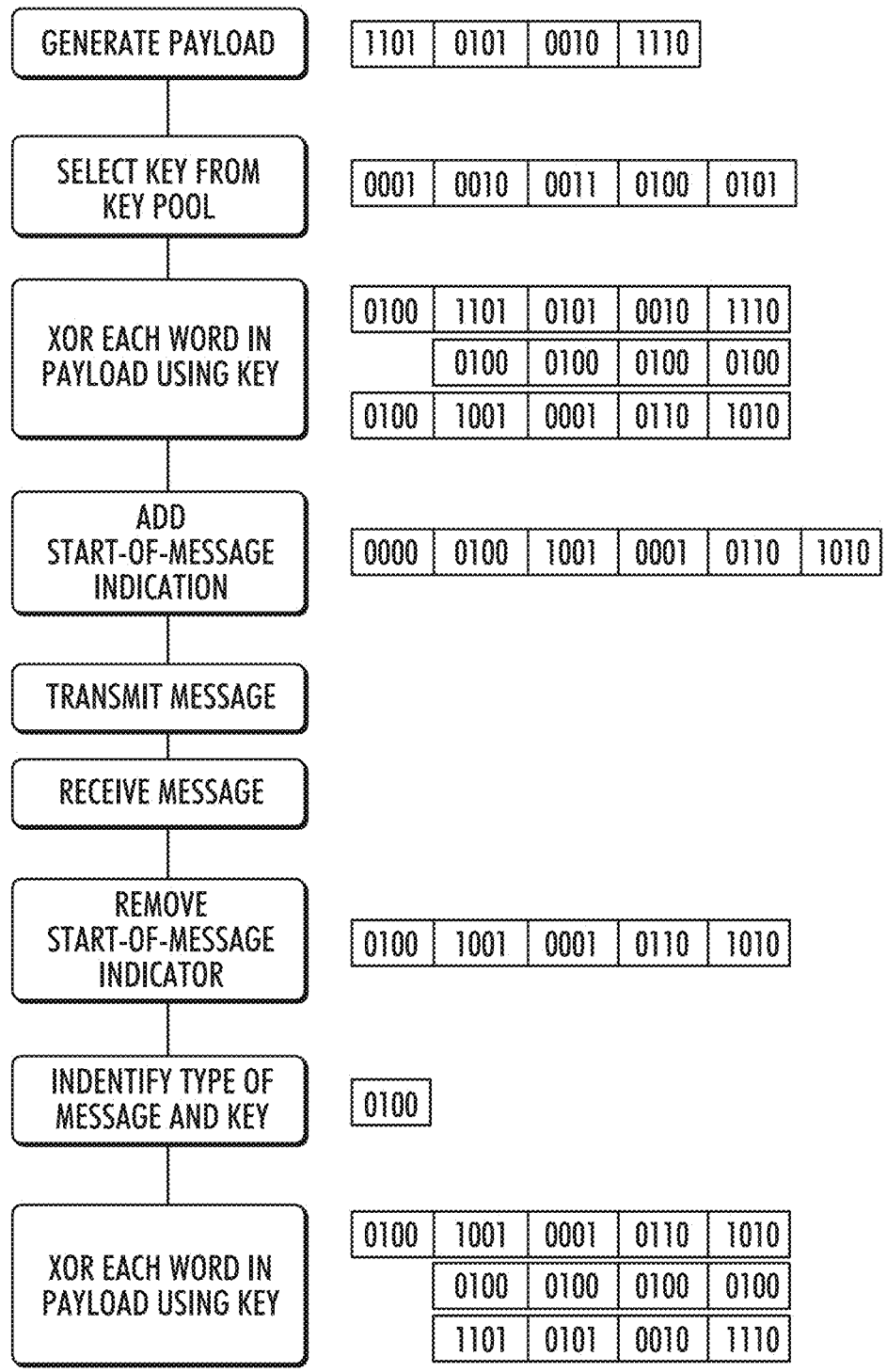
Figure 2:
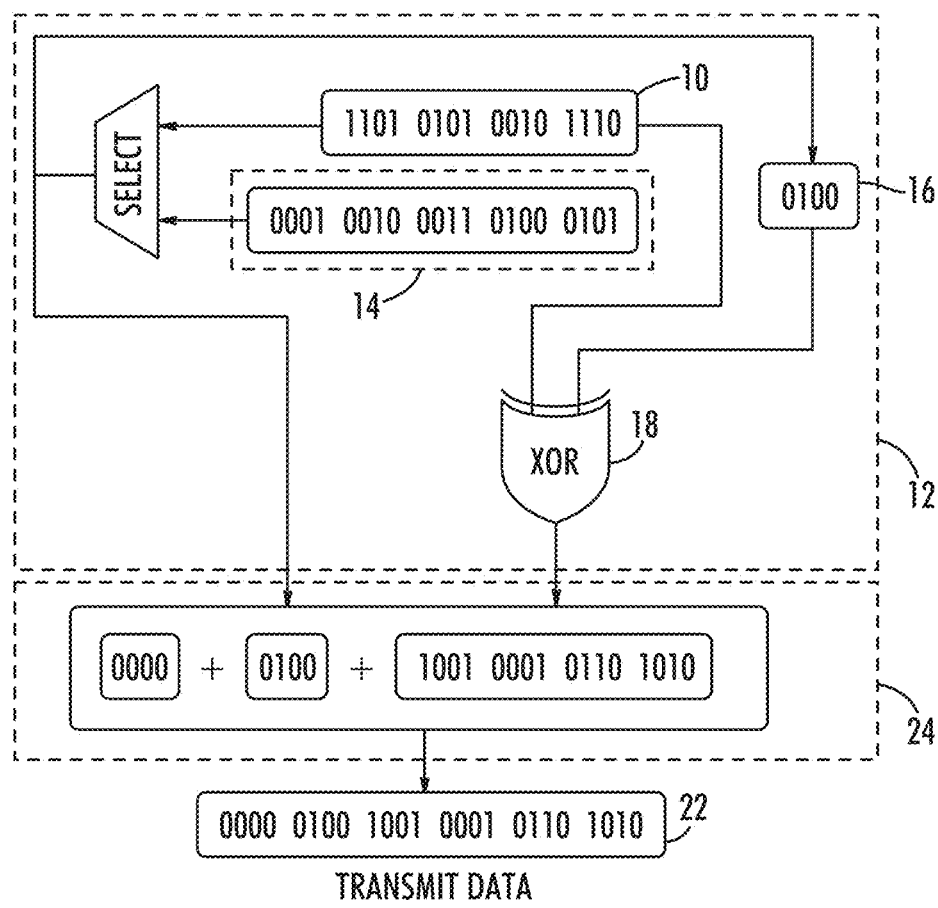
Figure 3:
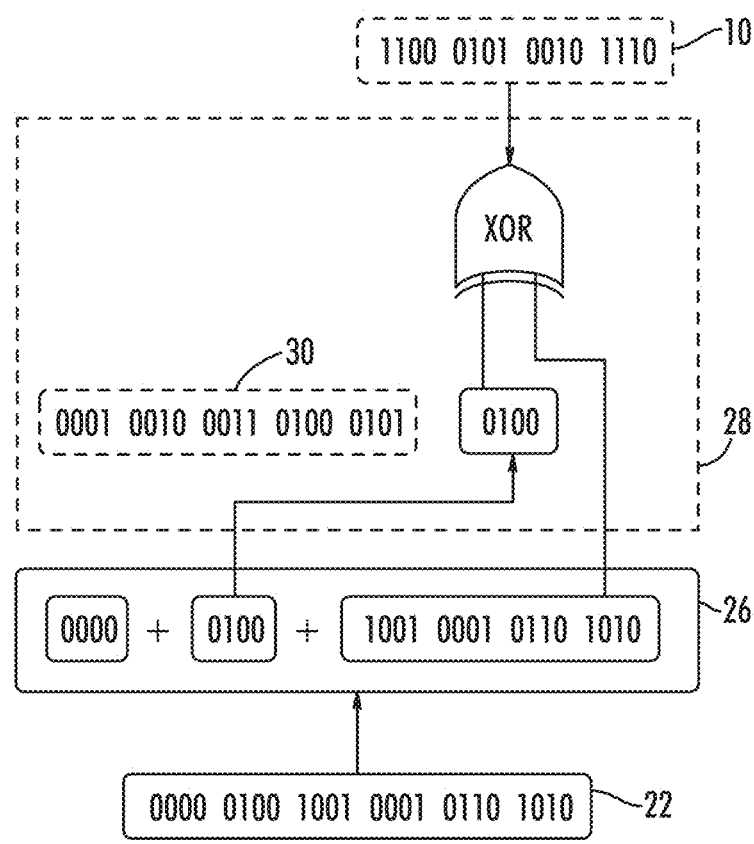

Having thus described variations of the disclosure in general terms, reference will now be made to the accompanying drawings, which are not necessarily drawn to scale, and wherein:

FIG. 1 is a process flow diagram of the present method of synchronizing messages;

FIG. 2 is a schematic diagram of the logic circuitry required on the transmission side for sending a message according to the method of FIG. 1; and FIG. 3 is a schematic diagram of the logic circuitry required on the reception side for receiving the message sent according to the method of FIG. 1.

DETAILED DESCRIPTION

Aspects of the present disclosure are directed to message synchronization by using a key word to perform an exclusive-OR operation on the words of the message to assure that the start-of-message indicator does not appear in the message as transmitted and received, and simultaneously using the key word to identity message type, which relates to message length.

Clear, unambiguous demarcation of the start of a new message allows the receiver to synchronize a data stream. In this description, "silence" on the line (i.e., the lack of current messages) is indicated by a continuous stream of logical '1' values, as is traditional in serial communications. This presumption is not a requirement of the method, however, and the relevant descriptions below may be reversed in polarity so that a stream of logical "0" values is used to indicate a lack of current messages.

Each message type must have, preselected at design-time, a pool of key words, digital sequences, chosen from all possible binary combinations of B bits, with the single exception of the word comprising all zeros (assuming the use of the prior art convention of silence being all ones). The size of the pool must be at least one word greater than the number of words W in message type N, or $W_N+1$. The total number of words available for the pools is $2^B-1$, where B is the number of bits in a word, including one word comprising all zeros that is reserved for the start-of-message word. Pool values may be either sequentially chosen or arbitrary chosen, although processing the messages may be simplified if the selection of the words for the pool is done sequentially.

The pool for each message type must contain one more word than the number of words in the message so that there will always be at least one word that is (1) in the pool, but (2) not used in the message, which unused word can then serve as the key word to identify the message type. A word appearing in the message identifies the type of message if (1) it is in the position in the message designated for the key word and (2) it is one of the words in the key pool for that type of message.

In the degenerate case where N=1, that is, when there is only one type of message, the total message length must always be less than $2^B$.

The first word to be transmitted in every message, regardless of message type, is referred to as the start-of-message indicator. This indicator is a string of logical zeros, the string length being the number of bits in one complete word. An alternative aspect of the disclosure that allows a non-"all zero" start-of-message word is described below, and, of course, if the polarity is reversed so that "silence" on the line is indicated by all zeros rather than all ones, the start-of-message indicator may simply be all ones.

The key word may be positioned anywhere in the message, but it must be located in the same position in every message across all message types, for example, it may be the second word in the message, following only the start-of-message indicator word. However, there is an advantage to having the key word appended next after the start-of-message indicator. In the second position in the word sequence of the message, no buffering of any preceding words is needed.

The key word is chosen from the pool of potential key words for each message type and must not be the same value as any other words in the message. If the message contains any calculated values (i.e., cycle redundancy check (CRC), checksum), the key word must be chosen after the entire message is formulated. As long as the key word is different from any word in the message payload, its use in an exclusive-OR operation on the words of the message will not result in an all zero's word. Therefore, even if there is an all zero's word in the message before the exclusive-OR operation, the exclusive-OR operation using the key word will eliminate that all zero's word for transmission purposes so that there will only be one all-zero's word, namely, the start-of-message indicator.

Also, if the message doesn't use all possible bits (for example, American Standard Code for Information Interchange (ASCII) text that requires sending seven bits eight bits at a time), then it is easy to assign bits from the unused part of the code space and use only one key word per message type. This circumstance is a degenerate case that corresponds to using an identification byte to identify the message type.

A more interesting case occurs when $W_N$ is less than $2^B$. As an example, consider an 8-bit code space ($2^8$ equals 256 codes) and a message length of 16 codes. No matter how you construct the message, there must be at least $W_N$=256 words less the start-of-message indicator word leaving 240 codes that do not appear in the 16-word message. Using a pool of 17 potential key words, in this example, is then sufficient to assure that there will be a key word available, and will leave 239 ($W_N$−1) more codes to use in pools for other message types.

The rest of the message follows the start-of-message indicator and the key word, including any security-relevant or reliability-relevant values (i.e., checksums, CRCs, sequence numbers, fragment numbers). The message does not need to carry an indicator of the message type. The key word is chosen from a specific, designated pool for each message type, thus the message type is already identified by the key.

Referring now to FIGS. 1-3, the first step is to generate the message payload, that is, a digital message 10. In FIG. 1, a four word payload, namely, 1101 0101 0010 1110, is provided to a first processor 12 (see FIG. 2). The choice of key word comes next. The key pool contains five keys, 0001 0010 0011 0100 0101. A key word 16 is chosen out of a first memory 14 from this pre-selected pool of possible key words for the specific message type. In the present example, the key word chosen is 0100. Key word 0100 is selected because it has a value that is not the same as the value of any word in the message. Any keys that are in the message are temporarily removed from the pool; any remaining keys, such as 0100, the one selected in this example, can be used. Any of the remaining key words could be selected. Every word of the message payload (which does not include the start of message and the key word) is now combined with the key word by the exclusive-OR logical operator 18, as seen in FIG. 2. Performing this operation guarantees that the start-of-message indicator cannot appear in the message. Note that no additional digits are added to the message payload, such as "checksum" or CRC digits.

In an exclusive-OR operation, each code of each word in the digital message is combined with the corresponding code of the key word in the following way: the operation that is true (logical one) when either of its codes is true, but not both; otherwise, it is false (logical zero). On performing the exclusive-OR operation, the original message becomes 1001 0001 0110 1010. The final message is fully assembled by appending the start-of-message word, 0000, and the key word, 0100, to the digital message payload to yield an exclusive-OR digital message. The exclusive-OR digital message 22 is then sent to a transmitter 24 for transmitting to the receiver 26.

As shown in FIGS. 1 and 3, exclusive-OR digital message 22 is received at receiver 26. The first word received is the start-of-message indicator to indicate the start of this message 22. The second word received is key word 16 in this example, but key word 16 can be positioned anywhere in the message so long as it is always in the same position across every message of every type in the system. Placing it second, after the start-of-message indicator, avoids the need to buffer the message until key word 16 is received and thus permits processing more quickly. Keyword 16 is compared by a second processor 28 to the known list of words in the key word pool stored in a second memory 30 to verify that it is key word 16, and, assuming it is, it immediately identifies the message type and, by implication, the message length. In the event different message types are sent, such as in a multiplexed system and they have different lengths, identifying the message length quickly allows for more efficient reception of messages 22. Once the complete exclusive-OR digital message 22 is received, the key word operates using an exclusive-OR operator 30 on every word of the exclusive-OR digital message payload to restore digital message 22 to its original state.

Mission-critical or life-critical systems benefit from the enhanced assurance of uniquely identifying each message type. This is most obvious in a Time-Domain-Multiplexed system, where various message types are carried on the same physical line. However, even Frequency-Domain multiplexed systems, or systems where each message type is carried by a dedicated physical line can benefit from this, as it makes cross-connections obvious when a message type is received in an unexpected location. The present method provides a clear identification of each message type.

An first optimization of the present method is possible if the key word pool for a message type is chosen to contain two more words than the number of words in the message, namely, an extra key word or $W_N$+2. Only $W_N$+1 words are required for the method described first above. In this optimization, the additional key word is pre-selected to indicate that the message payload contains no "All zeros" words, and thus has not been subject to the exclusive-OR logical operator, and, accordingly, does not require any post-processing. This optimization may primarily benefit microprocessor-based systems because the exclusive-OR operation is highly efficient and rapid in an FPGA/ASIC or discrete logic system.

In a second optimization, namely, the degenerate case where N=1, that is, there is only one type of message, it is possible to use the key word to indicate to a software system that no start-of-message indicator appears in the message, and thus no exclusive-OR operation needs to be performed, yet not complicate an FPGA/ASIC/Hardware based design. In such a case, the key word of "all ones" is not permitted in the key pool. The key word of "all zeros" is used to indicate no "all zeros" words appear in the one-word message; and this key word, in all cases, must be logically inverted ("NOT-ed") after performing the required exclusive-OR operations. Note that an exclusive-OR operation on the words of the message with an all zeros key word leaves the message unchanged. The inverted key word is transmitted with the exclusive-OR digital message but is again logically inverted prior to the exclusive-OR operation, to recreate the original digital message. The receiver simply looks for the "all ones" key word (resulting from the inversion of the "all zeros" key word) as the signal that it does not need to perform the exclusive-OR operation since it will be unchanged.

This second optimization of the invention has the benefit of allowing a receiver to skip performing an exclusive-OR operation when it is not required without penalizing implementations that choose to always perform the exclusive-OR operation regardless of whether it is necessary or not.

A start-of-message indicator other than "all zeros" can also be accomplished as an alternative to the primary process, if desired. An arbitrary start-of-message indicator is selected. A key pool is selected for the particular message type in which the start-of-message word does not appear in the selected key word pool. A key word is then selected from the key word pool that is unique to the message; that is, it does not appear anywhere in the message.

This selected word will be referred to herein as a proto-key word and is not used to perform the exclusive-OR operation on the words of the message as in the primary method. Instead, the proto-key word is combined with the start-of-message indicator using the exclusive-OR logical operator to form the key word. This key word is then treated exactly as indicated in the method as describe above, namely, using the key word in an exclusive-OR operation with each of the words in the message payload prior to transmission. The key word is appended to and transmitted with the message, and is then used to perform an exclusive-OR operation on the received message to recreate the original message.

In essence, this alternate aspect of the method works because the only word that can be exclusive-OR-ed with the start-of-message indicator and result in a duplicate of the start-of-message indicator is an "all zeros" word and the only word that can be exclusive-OR-ed with the proto-key word and result in an "all zeros" output word is a duplicate of the proto key word. Thus, because the proto-key word must be unique in the entire message, no word of the message will be "all zeros" prior to the exclusive-OR operation with the start-of-message indicator, thereby ensuring the start-of-message indicator remains unique. Finally, the exclusive-OR operation of the proto-key word with the start-of-message indicator protects against the case wherein a word in the message matches the key word. Without a final exclusive-OR operation using the start-of-message indicator, this value would result in a duplicate of the indicator in the message. It should be noted that, even in the trivial case where the start-of-message indicator is all zeros, this operation is still carried out. It is simply the case that an exclusive-OR operation applied using a key word of all zeros has no effect on the initial value.

When introducing elements of the present disclosure or exemplary aspects or embodiment(s) thereof, the articles "a," "an," "the" and "said" are intended to mean that there are one or more of the elements. The terms "comprising," "including" and "having" are intended to be inclusive and mean that there may be additional elements other than the listed elements. Although this disclosure has been described with respect to specific embodiments, the details of these embodiments are not to be construed as limitations.

What is claimed is:

1. A method for sending a digital message comprising:
   selecting a digital message having at least one word;
   selecting a key word;
   performing an exclusive-OR operation using said key word and said at least one word of said digital message to obtain an exclusive-OR digital message;
   appending said key word to said exclusive-OR digital message;
   transmitting said key word and said exclusive-OR digital message;
   receiving said key word and said exclusive-OR digital message; and
   performing an exclusive-OR operation using said key word and said exclusive-OR digital message to recreate said digital message from said exclusive-OR digital message.

2. The method as recited in claim 1, wherein said key word is selected so as to not be the same as said at least one word in said message.

3. The method as recited in claim 1, further comprising the step of selecting plural key words into a pool of key words from which said key word can be selected.

4. The method as recited in claim 3, wherein each digital message is a message type characterized by a fixed number of words; and wherein said method further comprises the step of selecting said pool of key words for each message type.

5. The method as recited in claim 4, wherein said key word selecting step further comprises the steps of:
   determining the number of words in said digital message;
   determining said message type from said number of word; and
   selecting, from said pool of key words for said message type, said key word to be appended to said exclusive-OR digital message.

6. The method as recited in claim 1, further comprising the step of selecting a start-of-message word.

7. The method as recited in claim 6, further comprising the step of appending said start-of-message word to said key word and said exclusive-OR digital message before transmitting said key word and said exclusive-OR digital message to a receiver.

8. The method as recited in claim 6, wherein said start-of-message word is an all-zeros word.

9. The method as recited in claim 7, wherein said start-of-message word is not identical to any word in said message.

10. The method as recited in claim 1, wherein said at least one word in said digital message and said key word are the same length.

11. The method as recited in claim 1, wherein said key word is appended to the front of said exclusive-OR digital message.

12. A method for sending a digital message comprising:
   selecting a digital message having one word;
   selecting a key word that is not the same as said one word;

performing an exclusive-OR, operation using said key word and said one word of said digital message to obtain an exclusive-OR digital message;

inverting the key word;

appending said inverted key word to said exclusive-OR digital message;

transmitting said inverted key word and said exclusive-OR digital message without a start-of-message word;

receiving said key word and said exclusive-OR digital message;

inverting said inverted key word to recover said key word; and performing an exclusive-OR operation using said recovered key word and said exclusive-OR digital message to recreate said digital message from said exclusive-OR digital message.

13. The method of claim 12, wherein, when said key word does not have a value of all ones.

14. The method of claim 12, wherein, when said one word of said digital message does not have a value of all zeros and said key word has a value of all zeros.

15. A communication system comprising:
a transmitter;
a receiver;
a first processor configured to receive a digital message having at least one word and to perform an exclusive-OR operation on a key word and said at least one word in said digital message, said first processor connected to said transmitter, said key word selected from a pre-selected pool of key words; and
a first memory connected to said processor, said first memory containing said preselected pool of key words, whence said first processor selects said key word, said first processor performing said exclusive-OR operation using said key word and said at least one word of said digital message to form an exclusive-OR digital message, said first processor appending said key word to said exclusive-OR digital message, said transmitter transmitting said exclusive-OR digital message with said appended key word to said receiver;
a second processor configured to receive said digital message from said receiver and said key word and to perform an exclusive-OR operation on said message using said key word to obtain said digital message.

16. The communication system of claim 15, wherein said key word is selected to have a value different from the value of said at least one word in said digital message.

17. The communication system of claim 15, further comprising a start-of-message word appended to said exclusive-OR digital message.

18. The communication system of claim 15, further comprising a second memory connected to said second processor, said second memory also containing said pool of key words whereby said key word appended to said exclusive-OR digital message may be verified.

19. The communications system of claim 18, wherein each digital message has a type based on the number of words in said digital message and wherein said pool of key words corresponds to said type.

20. The communication system of claim 19, wherein said key word corresponds to the type of said digital message in said digital message and wherein said second processor determines the number of words in said digital message and processes said message based on said number of words.

* * * * *

UNITED STATES PATENT AND TRADEMARK OFFICE
CERTIFICATE OF CORRECTION

PATENT NO.        : 9,438,411 B1
APPLICATION NO.   : 14/824330
DATED             : September 6, 2016
INVENTOR(S)       : Brian C. Lojeck and Albert A. Williams It is certified that error appears in the above-identified patent and that said Letters Patent is hereby corrected as shown below:

In the Claims

Column 8, Lines 11-30 should be corrected to read as follows:

1. A method for sending a digital message comprising:
selecting a digital message for transmission, said digital message containing a word;
selecting a key word to be transmitted with said digital message;
performing an exclusive-OR operation using said key word and said word of said digital message to obtain an exclusive-OR digital message;
appending said key word to said exclusive-OR digital message;
transmitting said key word and said exclusive-OR digital message;
receiving said key word and said exclusive-OR digital message; and
performing an exclusive-OR operation using said key word and said received exclusive-OR digital message to recreate said digital message.

2. The method as recited in claim 1, wherein said key word is selected so as to not be the same as said word in said digital message.

Column 8, Lines 34-38 should be corrected to read as follows:

4. The method as recited in claim 3, wherein each digital message is a message type characterized by a fixed number of words.

Column 8, Lines 56-58 should be corrected to read as follows:

9. The method as recited in claim 7, wherein said start-of-message word is not identical to any word in said exclusive-OR digital message.

Signed and Sealed this
Sixteenth Day of May, 2017

Michelle K. Lee
*Director of the United States Patent and Trademark Office*

CERTIFICATE OF CORRECTION (continued)
U.S. Pat. No. 9,438,411 B1

Column 8, Lines 59-61 should be corrected to read as follows:

10. The method as recited in claim 1, wherein said word in said digital message and said key word are the same length.

Column 8, Lines 65-67 and Column 9, Lines 1-16 should be corrected to read as follows:

12. A method for sending digital messages, said method comprising the steps of:
identifying a type of digital message to be transmitted, said digital message comprising digital words;
determining the number of said digital words in said type of digital message, each of said digital words having a number of digital bits, said number of digital bits corresponding to a total number of digital words possible using said number of digital bits;
selecting key words from said total number of digital words possible for a key word pool, plus a start-of-message indicator digital word, said selected key words being more than the number of said digital words in said digital message;
selecting one key word from said key word pool that does not appear among said words in said digital message and is not said start-of-message indicator word;
performing an exclusive-OR operation on said digital words of said digital message using said one key word to form an exclusive-OR digital message;
appending said one key word to said exclusive-OR digital message;
transmitting said start-of-message indicator word, said one key word, and said exclusive-OR digital message to a receiver;
receiving said start-of-message indicator word, said one key word, and said exclusive-or digital message; and
performing an exclusive-OR operation on said exclusive-OR digital message using said one key word to recreate said digital message.

Column 9, Lines 17-18 should be corrected to read as follows:

13. The method of claim 12, further comprising the step of determining the number of said words in said received exclusive-OR digital message from said one key word if said one key word is in said key word pool.

Column 9, Lines 19-21 should be corrected to read as follows:

14. The method of claim 12, wherein said start-of-message indicator is a word comprising all zeros.

Column 10, Lines 18-22 should be corrected to read as follows:

18. The communication system of claim 15, further comprising a second memory connected to said second processor, said second memory also containing said pool of key words whereby said key word appended to said exclusive-OR digital message may be verified on receipt as being in said pool.